Patented Apr. 4, 1950

2,502,409

UNITED STATES PATENT OFFICE 2,502,409

POROUS COMPOSITION OF MATTER AND METHOD OF PREPARING THE SAME

Robert C. Bour, Chicago, Ill., assignor to National Cylinder Gas Company, Chicago, Ill., a corporation of Delaware No Drawing. Application June 22, 1946, Serial No. 678,671

9 Claims. (Cl. 206—0.7)

This invention relates to a porous composition of matter adapted for use as a heat insulating medium, as a sound insulating medium, and as a filler for acetylene cylinders. The invention further pertains to an acetylene cylinder provided with a filler consisting of the porous composition of this invention. The invention also relates to methods of preparing the porous composition of matter referred to.

It is well known that acetylene, when compressed, is subject to spontaneous decomposition resulting in a large increase in volume so that the compression of acetylene in cylinders is a dangerous procedure. To eliminate this danger, acetylene is commonly compressed in cylinders by a process including providing a cylinder completely filled with a highly porous and inert filling material and containing a suitable liquid solvent for acetylene, and then forcing acetylene gas into such a cylinder under pressure. The conventional inert porous filling material for use in acetylene cylinders comprises charcoal as an absorbent, diatomaceous earth as an interstitial filler, asbestos fiber serving to increase the mechanical strength, and Portland cement as a binder. Such a mixture is made up with water, and the resulting heavy mass is tamped into an acetylene cylinder which is then allowed to set for seven days. At the end of this period, the cylinder is heated under vacuum for seven days at 500° F. to dehydrate the mass completely. The porosity of the resulting cylinder filler is about 76%.

In general, the desirable characteristics of filling material for acetylene cylinders include a porosity of between 76 and 83%, small pore size, water resistance, stability at from −40° to 130° F., ability to withstand rough handling without settling or formation of voids, sufficient mechanical strength to give support to the cylinder wall, low specific gravity, high crushing strength, short curing time, and capacity for convenient introduction into the acetylene cylinder. It will be noted that the above-described conventional filling material has to be introduced into acetylene cylinders by tamping, and requires prolonged treatment for curing or setting.

It is, therefore, an important object of the present invention to provide a porous mineral composition suitable for use both as a filler for acetylene cylinders and as a heat or sound insulating medium and characterized by capacity for convenient introduction into acetylene cylinders prior to curing or setting, rapid curing or setting, high resistance to thermal and mechanical shock, high crushing strength, low specific gravity, and good resistance to water and to acid or basic material.

Another object of the present invention is to provide an acetylene cylinder having a porous filler characterized by the properties enumerated in the next preceding paragraph.

Still another object of the present invention is to provide methods for the preparation of porous mineral compositions of the nature indicated.

According to the present invention, porous mineral compositions are prepared by the curing or setting of aqueous compositions comprising, besides water, Portland cement, asbestos, and a finely divided precipitated calcium silicate having an average particle size not substantially in excess of about one micron, the molecular ratio of $SiO_2$ to $CaO$ in said silicate being not less than about 2 to 1. Such a silicate is disclosed in the United States Patent No. 2,287,700 to Muskat et al., and reference is made to said patent for a detailed description. Said silicate material is marketed under the trade name "Silene." Two grades of this trade marked material are available, one having an average particle size of from 0.3 to 0.35 micron, and another having an average particle size of about 0.2 micron. Hereinbelow, unless otherwise indicated, the material of the smaller particle size is designated when the trade-mark "Silene" is used. It may be noted in this connection that "Silene" having an average particle size of 0.2 micron tends to give a more porous composition than "Silene" of larger particle size.

The "Silene" found in the market is a hydrated calcium silicate containing 19% $CaO$, and 67% $SiO_2$ and characterized by 14% loss in weight on ignition. The electron microscope indicates an ultimate particle size of 0.03 to 0.05 micron. The material appears to consist mainly of friable agglomerates which break up under the shearing forces imposed on milling or other treatment.

My aqueous composition containing "Silene," asbestos, and Portland cement begins to set almost immediately after mixing and develops, within a few hours, a strength which is comparable to that of the above-mentioned conventional filler after the latter has set for the usual seven day period. This rapid setting of my novel composition is accompanied by a considerable evolution of heat believed to be a result of a chemical reaction between the water, Portland cement, and "Silene." It is possible that this reaction may be due to the hydration of tricalcium silicate present in the Portland cement with a resultant formation of gelatinous silica and of calcium hydroxide which latter in turn reacts with the "Silene," since "Silene" is a hydrated calcium silicate containing less calcium hydroxide than the amount required to neutralize the silica present therein. The neutralization of the calcium hydroxide released from the Portland cement would cause the Portland cement to set more rapidly than otherwise, and probably result in a set or cured product comprising products of a reaction between Portland cement and "Silene."

In the above disclosed composition, the asbestos fiber contributes mechanical strength to the set or cured composition. Preferably, relatively long fibered asbestos is used comprising, for instance, fibers one-half inch long.

If desired, diatomaceous earth such as "Celite," acetylene black, or any other finely divided inert solid material can be incorporated as filler or diluent. The limits for addition of such fillers are set by resulting diminution in mechanical strength, porosity, or other essential features.

With respect to the amount of "Silene," Portland cement, and asbestos to be used, it should be noted that, for best results, combinations of these materials should be used that do not crack, that do not shrink away from the walls of a container, that set at room temperature within seven days, and that exhibit porosities of at least 75%. Compositions containing less than 10% "Silene" show a porosity of less than 75%, while compositions containing more than 80% "Silene" do not set thoroughly at room temperature within seven days and show cracking. Compositions containing less than 10% Portland cement do not set, while compositions containing more than 70% Portland cement show porosities of less than 75%. Compositions containing less than 5% asbestos sometimes show cracks, while compositions containing more than 40% asbestos are too fibrous to fill the container without leaving large voids. Thus, the limiting percentages within which most operative compositions are to be found are the following:

|  | Per cent |
|---|---|
| "Silene" | 10 to 80 |
| Portland cement | 10 to 70 |
| Asbestos | 5 to 40 |

The following are examples of satisfactory compositions including "Silene," Portland cement, and asbestos:

| Composition Number | Per cent "Silene" | Per cent Portland Cement | Per cent Asbestos |
|---|---|---|---|
| 1 | 10 | 50 | 40 |
| 2 | 80 | 10 | 10 |
| 3 | 75 | 10 | 15 |
| 4 | 70 | 10 | 20 |
| 5 | 25 | 70 | 5 |
| 6 | 30 | 65 | 5 |
| 7 | 30 | 30 | 40 |
| 8 | 25 | 35 | 40 |
| 9 | 50 | 25 | 25 |
| 10 | 60 | 20 | 20 |
| 11 | 61.5 | 30.8 | 7.7 |
| 12 | 64 | 32 | 4 |
| 13 | 56.25 | 31.25 | 12.5 |
| 14 | 62.5 | 25 | 12.5 |
| 15 | 50 | 37.5 | 12.5 |

The last seven tabulated compositions were made up with the percentages of water tabulated as follows:

| Composition Number | Water in Per cent of Total Dry Material |
|---|---|
| 8 | 250 |
| 9 | 260 |
| 10 | 200 |
| 11 | 224 |
| 12 | 250 |
| 13 | 250 |
| 14 | 260 |
| 15 | 250 |

In general, from 75 to 350% of water by weight of the dry material may be employed. The amount of water used should be sufficient to yield an easily flowable material, for convenient filling of cylinders, and at the same time should not be sufficient to cause shrinkage or formation of voids on setting or curing. In compositions having relatively high Portland cement contents, more water has to be used. Since "Silene" absorbs more water than Portland cement, an increased Portland cement content tends to lower the viscosity.

For very apparent reasons, it is desirable to have a filler mixture retain its fluidity for a period of several hours. I have found that the inclusion with any one of the above-disclosed aqueous compositions containing "Silene," Portland cement, and asbestos, of sucrose in an amount, for instance, of 3%, retards setting effectively for more than four hours while increasing the strength of the finished product considerably.

To eliminate voids, both in the prepared mixture prior to filling a cylinder and in the filled cylinder, the prepared mixture may be subjected to strong vacuum (prior to being introduced into the cylinder) with simultaneous vibration or stirring, until all entrapped air is removed. If a very high vacuum is used, water will be boiled off to some extent, thus decreasing the fluidity slightly, but this can easily be corrected by using a slight excess of water in the original mixture. The vacuum need be applied only for a few minutes under the conditions indicated. If the acetylene cylinder is then evacuated before this deareated mixture is introduced and a vacuum applied to the top of the cylinder while the mixture is poured into a funnel, the formation of voids is practically completely prevented.

Very satisfactory setting may be effected by allowing the filled acetylene cylinder to stand at room temperatures for seven days and then baking the cylinder, with the cap removed, to dryness. The resulting monolithic masses within the filled cylinders are characterized by good mechanical strength and porosity. However, curing may be greatly accelerated by capping a filled cylinder, placing the capped and filled cylinder in a steam oven kept at about 200° C. for about 16 hours, removing the cap and baking the cylinder to dryness. This treatment was found to increase the compressive strength to almost double that of the same filler cured for seven days at room temperatures. Temperatures of 175° C., 150° C., and 120° C., have also been employed. At these lower temperatures, more rapid curing and increased mechanical strength (as compared with setting at room temperature) were noted, although, in general, there is a progressive increase in mechanical strength as the curing temperature is increased. Curing is preferably effected at a temperature in excess of 100° C.

Cylinders filled with porous material are charged with acetylene by a process including the steps of filling the porous material within the container with a suitable solvent for acetylene, such as acetone, and then pumping acetylene gas under pressure into the cylinder. For instance, acetylene gas may be pumped into the cylinder at 310 lbs. pressure for about 24 hours. A cylinder filled with a composition made up of 65 lbs. "Silene," 13 lbs. asbestos, 26 lbs. Portland cement, and 198 lbs. water, cured as disclosed hereinabove at room temperature and charged with 38 lbs. acetone, was found capable of absorbing 20.7 lbs. of acetylene, while a similar container of the same capacity filled with a conventional filling material absorbed 19.8 lbs. acetylene gas in the presence of 38 lbs. acetone. When 40 lbs. acetone were introduced into each of these two cylinders, the cylinders containing my novel filling material absorbed 21.25 lbs. of acetylene while the cylinder containing the conventional filling material absorbed 19.25 lbs. acetylene. Thus, the filling materials of my invention are equal, if not superior, to standard acetylene fillers with respect to capacity to absorb acetylene. At the same time the filling materials of my invention are distinguished by much greater mechanical strength, shock resistance, porosity, lower gravity, higher porosity, less tendency to form voids and to shrink away from the container walls, and by being capable of being introduced into the cylinder to be filled by simple pouring through a funnel.

The compositions of the present invention are also characterized by good heat insulating properties, as shown by the following example. A mixture of 200 grams "Silene," 150 grams Portland cement, 50 grams asbestos, and 1000 grams water, to which 3% sucrose was added, was prepared and allowed to cure at room temperature for seven days. Blocks thus prepared were then heated to dryness and tested by the flat plate method. The following results, expressed in B. t. u. per hour per square foot of surface per degrees Fahrenheit of temperature difference between opposite surfaces for one inch thickness at the temperatures listed, were obtained:

| | |
|---|---|
| 80° F | 0.64 |
| 150° F | 0.655 |
| 250° F | 0.67 |
| 350° F | 0.70 |

Due to the high mechanical strength, shock resistance, and porosity of the set compositions of the present invention, such compositions can also be used whenever a solid material having these properties is desired.

It should be understood that many variations in procedure and composition are permissible without departing from the principles of this invention and without sacrificing the advantages mentioned hereinabove, and it is, therefore, not my purpose to limit the patent granted on this invention otherwise than necessitated by the scope of the appended claims.

I claim as my invention:

1. A composition capable of setting to form a hard porous mass comprising water, Portland cement, asbestos, and a finely divided precipitated calcium silicate having an average particle size not substantially in excess of about one micron, the molecular ratio of $SiO_2$ to $CaO$ in said silicate being not less than about two to one, the ratio between said solid ingredients being the following, expressed in parts by weight:

| | |
|---|---|
| Silicate | 10 to 80 |
| Portland cement | 10 to 70 |
| Asbestos | 5 to 40 | the quantity of water being from about 75% to about 350% by weight of the dry ingredients.

2. A composition capable of setting to form a hard porous mass comprising water, Portland cement, asbestos, and a finely divided precipitated calcium silicate having an average particle size not substantially in excess of about one micron, the molecular ratio of $SiO_2$ to $CaO$ in said silicate being not less than about two to one, the ratio between said solid ingredients being the following, expressed in parts by weight:

| | |
|---|---|
| Silicate | 10 to 80 |
| Portland cement | 10 to 70 |
| Asbestos | 5 to 40 | the quantity of water being from about 75% to about 350% by weight of the dry ingredients, and said composition further comprising sugar as a retardant for setting.

3. A hard porous composition comprising asbestos and a setting product of a mixture of water, Portland cement, said asbestos and a finely divided precipitated calcium silicate having an average particle size not substantially in excess of about one micron, the molecular ratio of $SiO_2$ to $CaO$ in said silicate being not less than about two to one, and the ratio between said three solid ingredients being the following:

| | |
|---|---|
| Silicate | 10 to 80 |
| Portland cement | 10 to 70 |
| Asbestos | 5 to 40 | said mixtures initially containing water amounting to from 75% to 350% by weight of the solid ingredients.

4. A method of preparing a hard, porous composition comprising providing a mixture of water, Portland cement, asbestos, and a finely divided precipitated calcium silicate having an average particle size not substantially in excess of about one micron, the molecular ratio of $SiO_2$ to $CaO$ in said silicate being not less than about two to one, and the ratio between the solid ingredients being the following:

| | |
|---|---|
| Silicate | 10 to 80 |
| Portland cement | 10 to 70 |
| Asbestos | 5 to 40 | said mixture initially containing water amounting to from 75% to 350% by weight of the solid ingredients, and curing said mixture.

5. A method of preparing a hard, porous composition comprising providing a mixture of water, Portland cement, asbestos, and a finely divided precipitated calcium silicate having an average particle size not substantially in excess of about one micron, the molecular ratio of $SiO_2$ to $CaO$ in said silicate being not less than about two to one, and the ratio between the solid ingredients being the following:

| | |
|---|---|
| Silicate | 10 to 80 |
| Portland cement | 10 to 70 |
| Asbestos | 5 to 40 | said mixture initially containing water amounting to from 75% to 350% by weight of the solid ingredients, and curing said mixture at a temperature in excess of 100° C.

6. For use in storing acetylene, the combination with a receptacle capable of being closed and of withstanding internal pressure of a monolithic mass of porous composition contained within said receptacle comprising asbestos and a setting product of a mixture of water, said asbestos, Portland cement and a finely divided precipitated calcium silicate having an average particle size not substantially in excess of about one micron, the molecular ratio of $SiO_2$ to $CaO$ in said silicate being not less than about two to one, the ratio between said three solid ingredients being the following:

| | |
|---|---|
| Silicate | 10 to 80 |
| Portland cement | 10 to 70 |
| Asbestos | 5 to 40 | the amount of water in said mixture initially amounting to 75% to 350% by weight of the dry ingredients.

7. A composition capable of setting to form a hard porous mass, comprising about 25% by weight of Portland cement, about 12.5% by weight of asbestos fiber, and about 62.5% by weight of a finely divided precipitated calcium silicate having an average particle size not substantially in excess of one micron and having a molecular ratio of $SiO_2$ to CaO of at least 2 to 1, together with water amounting to about 75% to 350% by weight of the other ingredients.

8. In an acetylene receptacle of the type in which acetylene is dissolved in a liquid solvent contained within a porous filling material completely filling the receptacle, a monolithic mass of porous composition formed of a cured mixture of from 10% to 70% by weight of Portland cement, from 10% to 80% by weight of a finely divided precipitated calcium silicate forming an average particle size not substantially in excess of 1 micron and having a molecular ratio of $SiO_2$ to CaO of at least 2 to 1, and containing from 5% to 40% by weight of asbestos, said mixture initially containing water amounting to 75% to 350% by weight of the solid ingredients.

9. In an acetylene receptacle of the type in which acetylene is dissolved in a liquid solvent contained within a porous filling material completely filling the receptacle, a monolithic mass of porous composition formed of a cured mixture initially comprising about 25% by weight of Portland cement, about 12.5% by weight of asbestos fiber, about 62.5% by weight of a finely divided precipitated calcium silicate having an average particle size not substantially in excess on one micron and being a molecular ratio of $SiO_2$ to CaO of at least 2 to 1, together with water amounting to about 200% by weight of the dry ingredients, said monolithic mass completely filling said receptacle without voids and being characterized by mechanical strength and resistance to crushing and by a porosity of at least 75%.

ROBERT C. BOUR.

REFERENCES CITED

The following references are of record in the file of this patent:

UNITED STATES PATENTS

| Number | Name | Date |
| --- | --- | --- |
| 1,332,525 | Smith | Mar. 2, 1920 |
| 1,574,380 | Endres | Feb. 23, 1926 |
| 1,567,663 | Marpillero | Dec. 29, 1926 |
| 1,767,514 | Dalen | June 24, 1930 |
| 1,920,358 | Clark | Aug. 1, 1933 |
| 2,146,448 | Scott | Feb. 7, 1939 |
| 2,316,487 | Reichert | Apr. 13, 1943 |
| 2,359,342 | Winding | Oct. 3, 1944 |
| 2,410,954 | Sharp | Nov. 12, 1946 |
| 2,422,251 | O'Brian | June 17, 1947 |

FOREIGN PATENTS

| Number | Country | Date |
| --- | --- | --- |
| 501,024 | Great Britain | of 1939 |